United States Patent [19]

Torrani

[11] 4,142,084
[45] Feb. 27, 1979

[54] WELDING APPARATUS

[75] Inventor: Roberto Torrani, Brent, Switzerland

[73] Assignee: Allgemeine Patentverwertung Anstalt, Triesen, Liechtenstein

[21] Appl. No.: 798,298

[22] Filed: May 19, 1977

[30] Foreign Application Priority Data

May 25, 1976 [CH] Switzerland .................. 6597/76

[51] Int. Cl.² .................................................. B23K 9/16
[52] U.S. Cl. ................................ 219/60 A; 219/61.5;
219/125.11; 285/13; 285/136
[58] Field of Search .............. 219/60 A, 61.5, 125.11;
285/13, 131, 136

[56] References Cited

U.S. PATENT DOCUMENTS

| 3,462,176 | 8/1969 | Goodrum | 285/136 |
| 3,621,182 | 11/1971 | Peyrot | 219/60 A |
| 3,754,114 | 8/1973 | Peyrot | 219/60 A |
| 3,754,115 | 8/1973 | Roberts et al. | 219/60 A |
| 3,784,778 | 1/1974 | McPherson et al. | 219/60 A |

Primary Examiner—J. V. Truhe
Assistant Examiner—Clifford C. Shaw

Attorney, Agent, or Firm—Olson, Trexler, Wolters, Bushnell & Fosse, Ltd.

[57] ABSTRACT

A machine for the automatic butt welding of pipes on tube plates by TIG or plasma process with or without weld metal, or of abutting pipes with TIG or plasma process with internal torch, comprising a control unit for programming the welding parameters according to cycles suitable to the different welding types and a gun which will be centered on the pipes to be welded, supporting a torch which can effect more sequential revolutions, wherein the supplies of the fluids (inert gas, cooling fluid, etc.) necessary to the welding operations are conveyed from the stationary part to the movable part through a coupling consisting of contiguous solids of revolution, stationary and movable respectively, in the thickness of which are provided the ducts, on the surface of one solid faced to the other being obtained recesses provided at their sides with seal elements, through said recesses the fluids passing from the ducts of the stationary body to the ducts of the movable body, and in which alternate to the recesses conveying the fluids are worked supplementary recesses with ducts leading to outside or to negative pressure sources so as to drain the fluids possibly escaping from the seal elements, avoiding thus their mixing.

6 Claims, 9 Drawing Figures

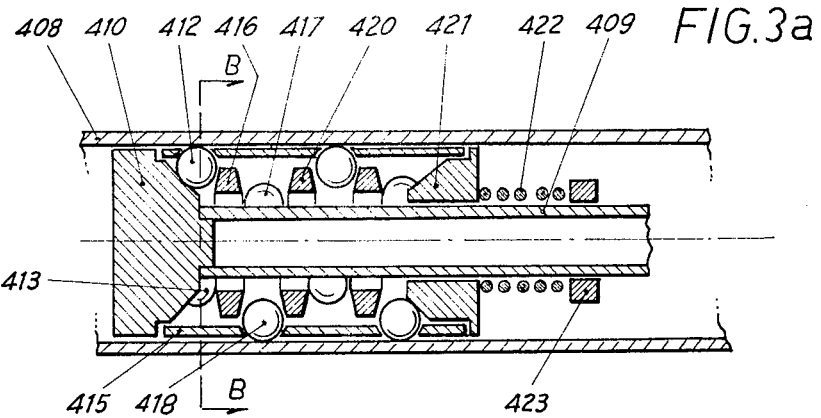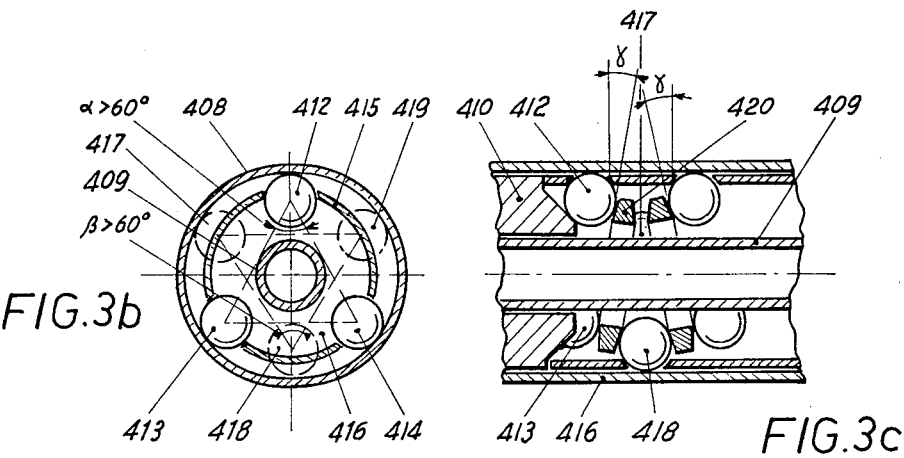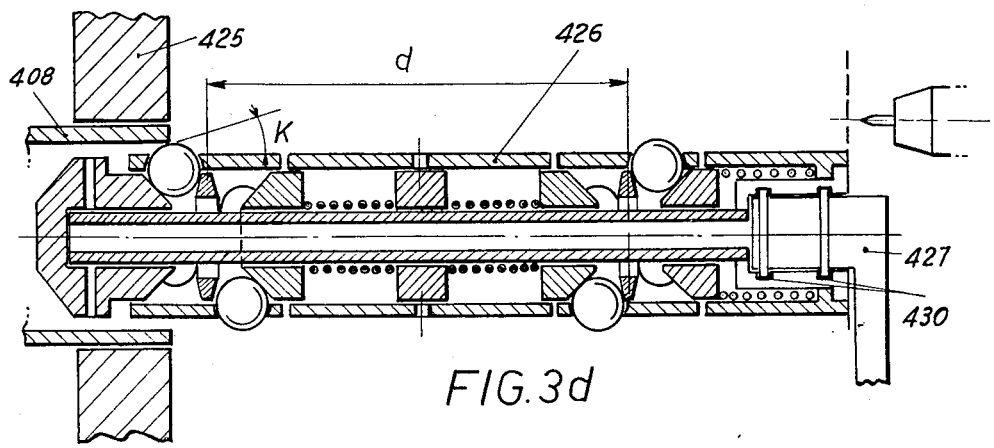

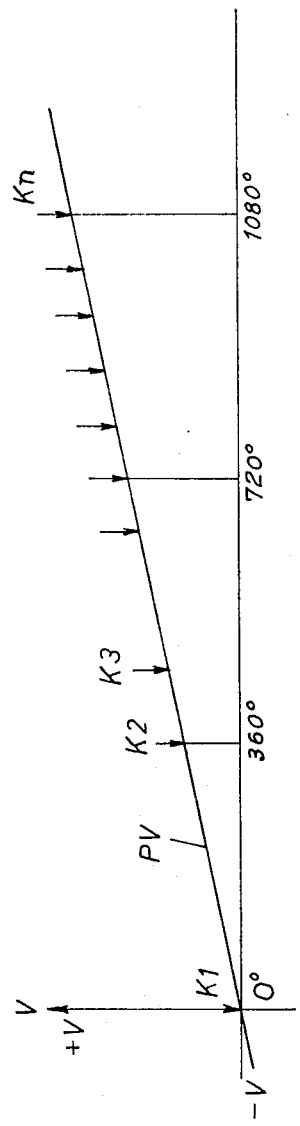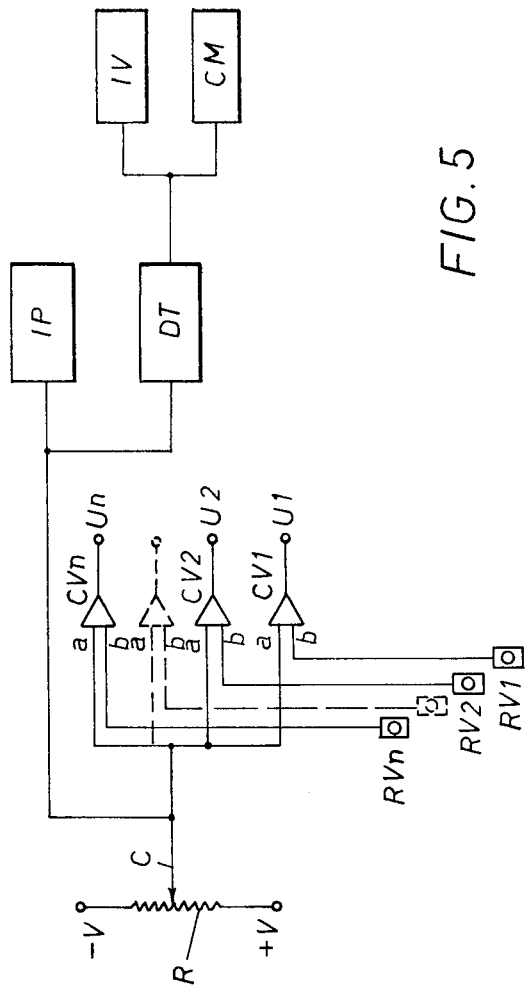
FIG.5

WELDING APPARATUS

The electric welding process TIG is known according to which a torch with a tungsten electrode moves along the edges to be welded, at a pre-fixed distance and precisely so that the electric arc which will be primed in an inert gas atmosphere will cause the melting of the edges themselves, or also known is the plasma welding where the melting is mainly caused by a high temperature gas jet ionized by an electric arc.

Particular contrivances must be adopted in order to obtain an absolute constancy of the intensity of the welding current according to a programmed cycle, an inert gas free from impurities and humidity, an effective removal of heat from the torch by circulation of a cooling fluid and constancy of the weld material, the whole according to a pre-fixed cycle.

In the particular case of welding pipes to tube plates, or butt welds of pipes, carried out from inside, the welding cycle consists of a sequence of subsequent revolutions which the torch must effect along the edge to be welded; during each revolution starting from a position which must be capable of being pre-fixed, a different operation is carried out, for instance pre-heating, welding, annealing, etc. Each of these operations is carried out normally on little more than a complete turn, in order to ensure an adequate overlapping; however it must be considered that as the weld operation is carried out in different positions of the torch (namely: above, below, upward, downward) during a same operation it can be necessary to change certain parameters, such as the intensity of current, the revolution speed of the torch, the amount of the weld metal, etc.

According to the present invention:

(A) the precision of the orbital displacement of the welding torch in the butt welds is ensured by an elastic self centering spindle which by rotating within the pipe the end of which is to be welded, imparts to said torch a path exactly equal to the shape of the pipe. In the welds carried out inside of the pipes with the torch fixed at the end of an extension, the exact axial positioning of the torch is further ensured by an improved cooling system of the extension itself so as to avoid axial expansions or bendings.

(B) The value of the welding current even if having a high intensity, is kept constant as the resistances to the electric contact between the stationary part of the gun and the rotating part thereof are reduced to a constant and disregardable value due to a coupling with amalgam lubricated rolling bodies.

(C) The welding cycle, namely the adjustment of the relative parameters according to the position of the torch, is carried out with a high degree of possible repetition due to the control made at each instant of the position and of the speed of the torch, carried out by a potentiometric device operated by the feeding movement of the torch itself.

The programming of the sequence of the operations and of the welding parameters is effected by a control unit, separate from the gun, but being an integrating part of the machine. By this unit, the programming of the parameters of the cycle can provide for sequential changes of the parameters during a single revolution so as to satisfy the need of the most complex weldings.

(D) The purity of the gas protecting against the oxidizing agents is ensured in the passage from the stationary part of the machine to the rotary part thereof, by a system of double protections, consisting of protecting grooves, so that also the accidental break of a seal ring will not allow the extraneous fluids (cooling fluid, air, amalgam) to enter into the gas circuit.

The present invention will now be described with reference to certain embodiments thereof at present preferred, and with reference to the attached drawings, wherein:

FIG. 3a shows a partial longitudinal section of a self centering spindle for the inside of the pipes;

FIG. 3b shows a cross sectional view taken along the plane A—A of FIG. 3a showing the relationship between the rest elements of the spindle in the presence of deformations in the internal shape of a pin;

FIG. 3c shows, correspondently with FIG. 3b the relationship between the abutment members of the spindle in presence of deformation of the internal shaping of the tube;

FIG. 3d shows in sectional view a detail of FIG. 3a when the spindle is inserted into a pipe;

FIG. 5 shows the block diagram and an explicative diagram of a circuitry which can be used for controlling the operation of the welding gun as shown in the preceding figures.

MECHANICAL PART

The welding gun consists of an outer stationary casing A wherefrom project: the casing B of the motor operating the rotating internal part and the connections for the supplies C and by an internal rotating part D terminating, in its rear part, by the support E also rotating, for the reel containing the weld metal wire.

Figure 1:
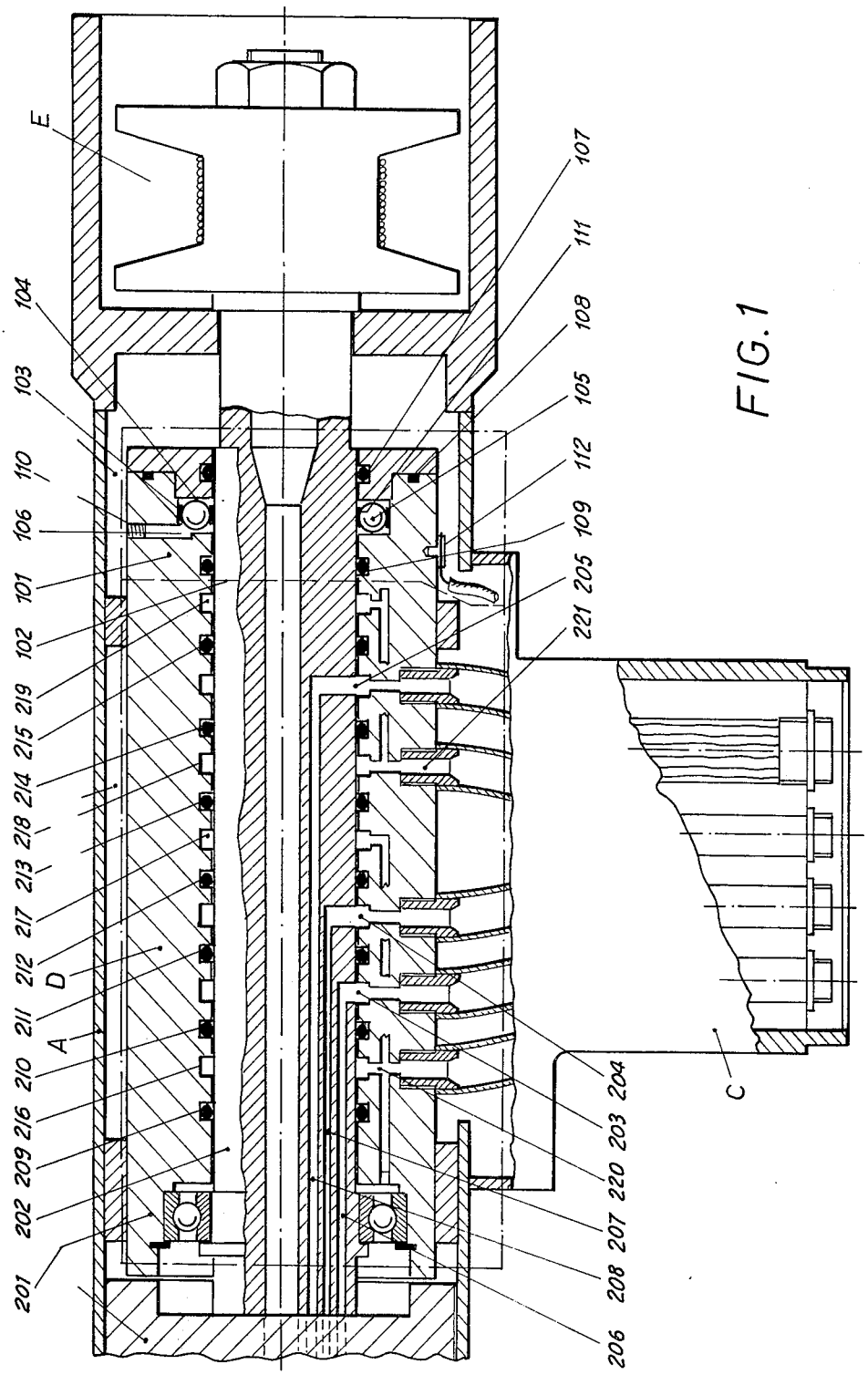
FIG. 1 shows the part of the welding gun related to the rotary joint for the electric connections and for the working fluids.

The internal rotating part D consists of more groups:

The group I shown in FIG. 1 consists of a support for rolling elements in amalgam bath suitable to transfer electric supply with high intensity from a stationary part 101 to a rotary part 102 and simultaneously suitable to mechanically center the parts.

The following description shows the geometry as at present preferred, consisting of two concentrical cylindrical bodies, the external of which is stationary; but the technical teaching according to the present invention can be applied to other solids, discs, cones, rings in relative movement with respect to one another, independently from that of the two parts which must be considered moving.

The cited device consists of a rolling race 103 obtained in the stationary part, or applied thereto, and of a race 104 obtained in the movable part or applied thereto, whereon roll rolling bodies 105 (which according to the cases may be spherical, cylindrical, conical) immersed in an amalgam bath which filling the recess 106 about said bodies serves the function of lubricating the contacting surfaces and of increasing the contact area suitable to the transfer of the electric current.

In order to avoid the formation of surfaces not perfectly wet by the amalgam, with the consequent variations of the contact resistances and growing of slag in the separating interface, as said slag, due to the high currents, would be capable of generating a damaging sparkling, the rolling races are covered by a metal 111 wettable by the amalgam itself.

Holding means 107, 108, 109 prevent the amalgam from escaping, the supply of which is obtained through the bore 110. The electric current is supplied through the terminal 112 and running along the central rotating body, the current reaches the welding torch.

The above described group I serves the function of centering support for the group II which will be now described.

The group II consists of a coupliing for the passage of a multiplicity of fluids from a stationary part to a rotating part. The device described hereinafter represents a substantial improvement in respect of the known rotary couplings as also in case of accidental break or of wear of one of the holding elements, the possibility of mixing fluids different from one another will be avoided.

The coupling is represented in its form suitable for the present application, but the disclosed improvement can be adapted to different shapes, namely paired discs or interchanging the movable part with the movable one.

The distributor shown in the attached drawing comprises two cylindrical parts 201, 202 rotating with respect to one another, precisely guided with respect to each other, so as to avoid the contacts.

In the drawings, the part 201 is assumed to be stationary, and the part 202 rotating. In the part 201 are provided the recesses 203, 204, 205, the recesses 203 and 204 being related to the inlet and the outlet of a first fluid, and the recess 205 to the inlet of a second fluid. Said recesses communicate with the ducts 206, 207, 208 provided in the rotary body 202 connecting said recesses to the utilization point of the fluids. By side of the recesses 203 to 205 are provided blind recesses receiving the sealing rings 209, 210, 211, 212, 213, 214, 215. Between the sealing rings 209-210; 212-213; 213-214 and outside the ring 215 are provided drainage recesses 216, 217, 218, 219 respectively, which open into the ducts 220, 221 connected to either outside or negative pressure sources for removing the fluids possibly escaping from the transmission recesses. The number of the transmission and drainage recesses has been shown only by way of example and must not be considered as a limitation.

By the arrangement according to this invention the advantage is thus obtained of preventing the mixing of incompatible or dangerously reacting fluids.

The group III only sketched in the drawing, is a unit which, operated by an internal motor and independently from the main motor, pulls the wire of the weld metal from the reel (located in the rear part of the machine E) feeding the welding torch. The particular construction of the mechanism allows the wire to be conveyed in a sheath so that it will be always insulated from the machine.

The group III is at present shown in its preferred position but it can also be located behind the rotary coupling. This group can be non utilized, or also it can also be missing in the machine when welds are to be effected withot weld metal.

Figure 2:
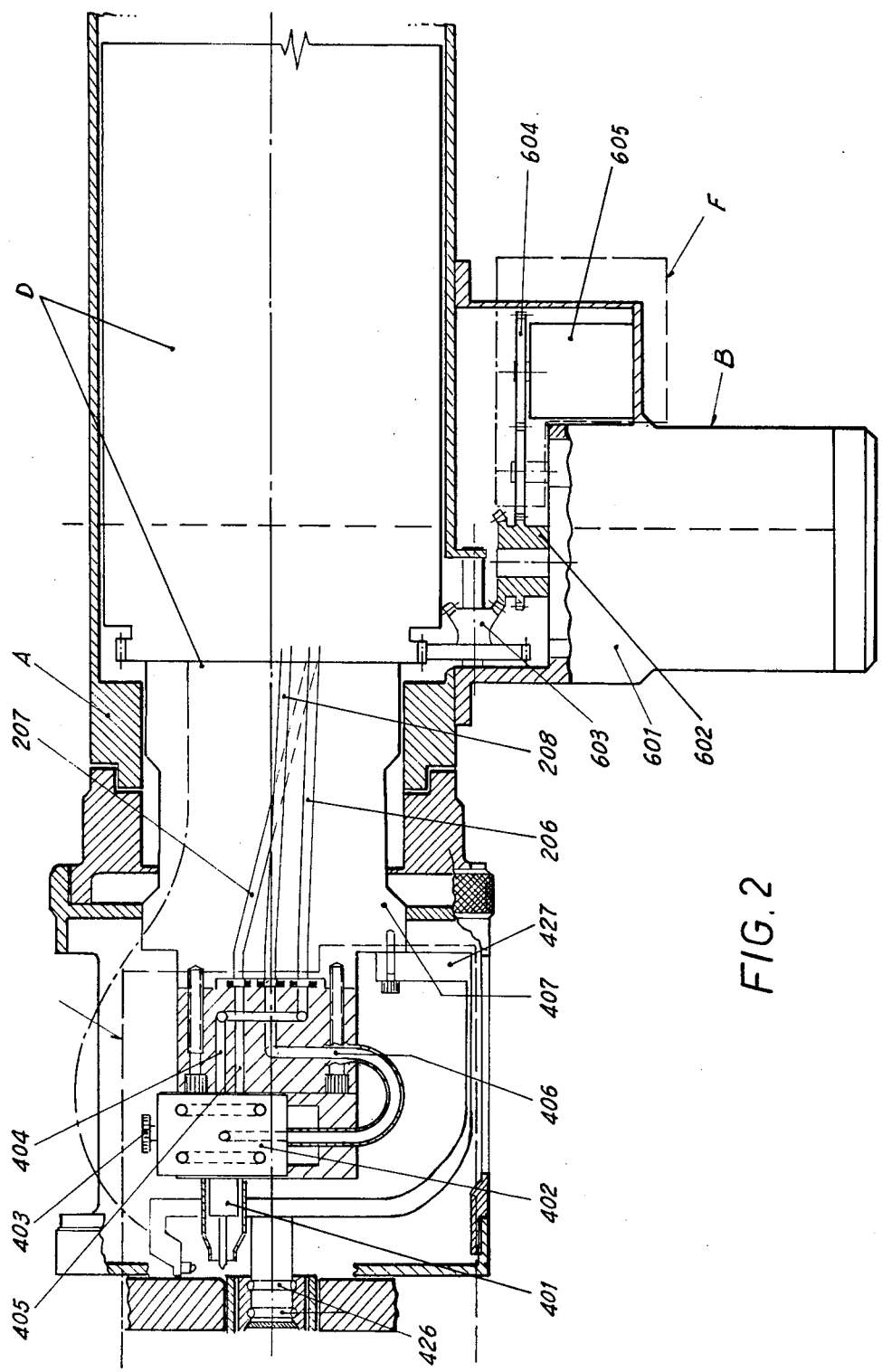
FIG. 2 is a sectional view of the central operating part of the gun equipped for butt welds on tube plates.

The group IV shown in FIG. 2 consists of the rotary welding torch and a centering spindle shown in FIG. 3a.

The torch 401 is mounted so as to be capable of being oriented on a slide 402 which through the adjusting screw 403 can be displaced allowing thus the torch to be positioned on the wanted welding diameter. The slide and the torch body have the bores 404, 405, 406 for the passage of the cooling fluid and of protecting gas, that they will receive, when mounted on the body 407, through the ducts 206, 207, 208 coming from the rotary coupling. The adjustment of the distance of the torch is obtained by means of the adjustment of the ring nut 428 which is threadedly engaged on the chamber 429. Said chamber is widely apertured in order to allow a good visibility of the welding operation. For particular types of weldings said chamber can be closed by means of transparent materials so as to insulate the welding zone from the outside, and with a further duct, to form a zone into which a protecting gas can be supplied.

To the rotary body 407 is fixed, by the support 427, also the self-centering rotating spindle which allows the whole machine to be elastically centered with respect to the pipe to be welded. Said self centering spindle, shown in FIG. 3a shows substantial improvements with respect to the rigid and stationary centering members.

Said rotary spindle is held centered with respect to the medium axis of the pipe by centering devices and rolling balls, located on more planes, forming the substantial part of the present invention, as they allow a rotation with no oscillation, of the axis of spindle itself also in case, most frequent, of either ovalization or size defects of the pipe.

In fact, if a simple ball ring located on a single plane is carried to contrast with the inner wall of the pipe by conical surfaces, axially sliding, a rigid figure will be embodied rotating inside the pipe: it may be remarked that if the cross section of the pipe instead of being circular is elliptic (or generally ovalized) there if, for a certain angle of rotation depending upon the number of the balls on the plane, a displacement of the centre of the figure, i.e. of the axis of the spindle, or the possibility that the balls, located in correspondence with the greatest axis of the ellipse will not be bearing on the wall of the pipe, allowing thus clearances which are not compatible with the wanted precision.

In the structure according to this invention, as hereinafter described, the balls forming the centering device are supported so as to form a non rigid figure, adapting to the shape of the pipe.

FIG. 3a shows the pipe 408 wherein the centering device is to be positioned. This device consists of a central shaft 409 with a fixed head 410 with a conical surface serving as a rolling race for the balls located on a first plane (said balls for clearness of example are shown in number of three) 412, 413, 414 held by a cage 415 free to rotate. As abutment to the conical surface, in order to outwards push the balls to contrast the pipe, there is a floating ring 416 having such a section as to form planes having an inclination appropriate to the diameter of the balls and to the clearance that they have with respect to the cage. Beyond this ring there are other balls 417, 418, 419 located on a second plane and held by the same cage 415 in a position angularly displaced with respect to the balls 412, 413, 414 of the first plane. The balls of the second plane have an abutment formed by a second floating ring 420, similar to the first cited ring.

The sequence of planes of balls, separate by floating rings, similar to that as described can be continued for a better centering of the device with respect to the pipe. The last plane of balls has as abutment a body with a conical surface 421 slidable on the shaft 409 and contrasting with the ball plane by means of a spring 422 which bears against a ring 423 fixed to the hollow shaft 409.

The purpose of the floating ring is, as aforesaid, that of rendering deformable the geometrical figure formed by the balls of two contiguous planes, as shown in FIG. 3b, showing a cross section of FIG. 3a, and in FIG. 3c showing the arrangement of the floating rings, when inserted into a tube having an elliptical cross section.

In fact, as shown by these figures, wherein the cross section of the pipe has been shown exaggeratedly elliptical by way of example, the inwards compression of the balls 412 and 418, in correspondence with the minor axis of the ellipse (representing the cross section of the pipe 408) causes the inclination through an angle $\gamma$ of the floating ring which pushes outwards the balls 413 and 414 located on the first plane, and 417-419 located on the second plane (shown in dotted line in FIG. 3b) to contact the pipe where it has a greatest diameter. The drawing shows that the triangles connecting the centres of the balls, shown in solid line for the first plane of balls 412, 413, 414 and in dotted line for the second plane of balls 417, 418, 419 are no more equilateral, but they are deformed as it can be seen from the angles $\alpha$ and $\beta$ which result greater than 60° in order to adapt to the shape of the pipe.

The spindle according to the present invention which is shown in FIG. 3d when inserted into the pipe to be welded on the tube plate 425 consists of at least two centering devices, each formed as above described, by at least two planes of balls and held spaced at a distance d by a spacer 426.

It is to be noted that in the form as shown, namely with only three balls for each plane, the centering device has a better flexibility, and in view of the relatively large diameter of the balls, it has a minor insertion angle K at the moment of insertion into the pipes, so that with respect to similar centering devices, a lesser effort is required for insertion, or at parity of effort, a same spindle is adequate to a larger range of diameters.

The hollow shaft 409 carries at its end a clamp on which the support 427 of the welding gun will be inserted by means of elastic elements 430 allowing its removal with no displacement of the centering spindle.

The advantages of the self centering spindle according to the present invention are as follows:

(a) the spindle requires no manual tightening, but it will tighten automatically and elastically due to the force exerted by the springs;

(b) the spindle rotates inside the pipe so as to keep centered on the medium axis of the pipe the axis of the spindle so as not to impart to the welding torch oscillations not compatible with the wanted precision;

(c) the connection of the welding gun to the spindle is embodied by elastic element so that the gun can be easily removed without removing the spindle. This allows other working or checking tools to be used on the same centering.

Figures 4A, 4B:
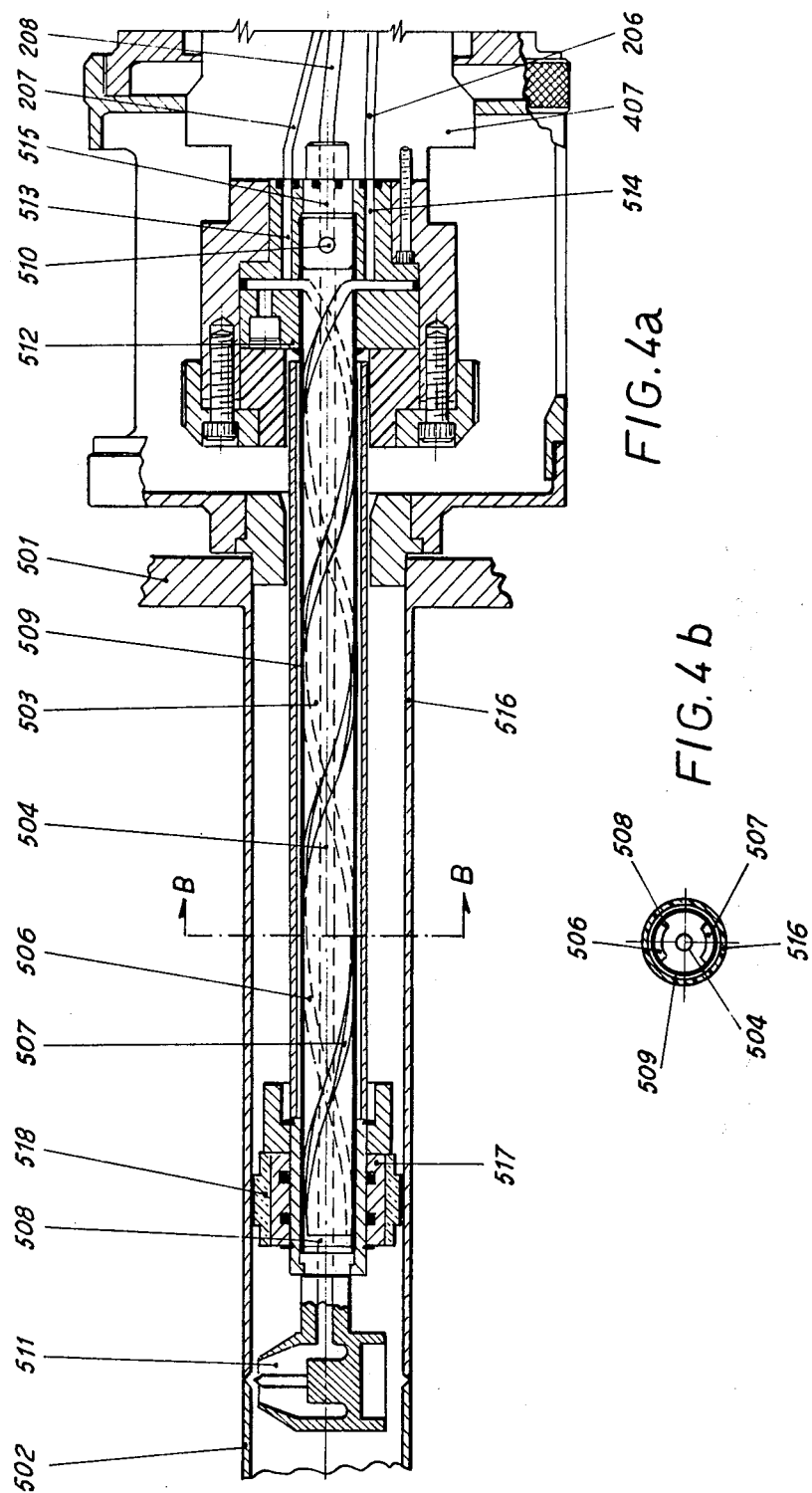
FIG. 4a shows a sectional view of the head of the gun equipped with an extension for butt welds on inside of tubular elements.
FIG. 4b shows a sectional view taken along the plane B—B of FIG. 4.

In alternative to the above described group IV (torch plus spiindle) in the machine it can be fixed to the body 407 an extension having a diameter less than that of the pipe to be welded, at the end of which it is fixed a torch effecting the welding from inside the pipe itself (FIG. 4a).

The main difficulty in positioning the torch consists in the thermal expansions of the extension, as said expansions, if not eliminated, would cause displacements inadmissible with respect to the plane of the welding or to the electrode-wall distance.

Hereinafter, the embodiment according to this invention will be described, consisting in a torch-carrying extension wherein the cooling system appears to be adquate to the removal of the drawback of the elongation or bend of the extension. The extension is shown in FIG. 4a where it has been illustrated already inserted into the support 407, making part of the rotary body of the gun, in operative position with respect to a tube plate 501 and to a pipe to be welded 502.

The extension consists of a shaft 503 with an internal duct 504 for the passage of the protection gas and on the outer wall of which are provided two or more helical grooves 506, 507 throughout the length of the shaft, without intersecting, up to the head of the shaft where they are rendered communicating with one another by a connection groove 508.

On the shaft is inserted, with a slight forcing, a precise tube 508 so that the grooves will form two ducts for supply and for return of the cooling fluid respectively. The tube is longer than the shaft, so as to form near the foot, a chamber 510 through which enters the protection gas which passing through the central bore 504 of the shaft reaches the welding torch 511 mounted on the head of the extension.

To the foot of the extension is fixed a block 512 provided with three ducts, two of which are for the cooling fluid, 513, 514, one for the gas 515, provided in such a position as to correspond to the connections mounted on the body 407 when the extension is fastened to the gun body, and to which the fluids from the ducts 206, 207, 208 arrive.

The extension is coated with insulating material 516 and guided near the torch by a bush 517 also coated with insulating material 518, in order to avoid electric discharges towards the pipe.

The operation of a machine for orbital weld is controlled by a control unit requiring continuously information as to the orbital position of the torch and its speed of rotation, in order to adjust the concerned variables, during a working cycle. These variables can be numerous but they are strictly correlated to the position and the speed of rotation of the torch through its orbital path in a working cycle.

At present it is provided to couple a precision potentiometer to the mechanism controlling the orbital movement of the torch in order to obtain a voltage function of the position at every instant of the torch, wherefrom signals representative of the angular position of the torch and of its speed of rotation can be obtained. It will be thus possible in function of the position of the torch, to program through one turn, or through more angular sectors, all weld parameters, such as for instance the intensity of the current, the speed of rotation, the speed of the wire of weld material, etc.

The above will be now described with reference to the figures as follows:

FIG. 2, wherein the group F shows the mechanical arrangement for coupling a precision potentiometer to the mechanism of the machine for orbital weld;

FIG. 5b showing a block diagram of the processing circuits of the signals concerned with the position and speed of the torch;

FIG. 5a showiing a chart by way of example of the operation of the device according to the present invention.

With reference to FIG. 2, the rotating part of the machine for orbital weld is rotated in orbital movement by the motor-reducer 601 and the group of gears 602, 603. The gear 602 of the motor reducer drives also the gear 604 connected to the control shaft of a precision potentiometer 605. During the rotational movement of the gear 602 and thus of the rotating part of the machine supporting the welding torch, it is possible to obtain a voltage ramp strictly related to the angular position of the torch 401, as far as the absolute value of the voltage is concerned, and with a slope strictly related to the speed of rotation of the torch in the orbit.

Thus it will be possible, by electric or electronic devices, located in a separate control unit: (a) in function of the voltage present on the slider of the potentiometer, to program various working cycles of the machine, by opening or closing sequentially the switches controlling the various welding parameters (supply of gas, feeding of the wire, intensity of the welding current, etc.); (b) in function of the derivative with respect to time of said voltage, to obtain a speed signal useful for instance as a feedback signal of the motor reducer 601.

With reference to FIG. 5b, the potentiometer 605 has a resistor R and a slider C mechanically connected to the shaft of the potentiometer. Thus a voltage will be available variable at least between $-V$ and $+V$ in function of the angular position of the welding head 401.

The trend of this voltage is shown in FIG. 5a by the straight line RV in the chart showing on the abscissae the degrees of rotations of the head 401. By way of example the abscissa in FIG. 5a extends through three complete revolutions of the head 401, namely 1080°.

The voltage available at the slider C of the potentiometer 605 is applied to the inputs a of the voltage comparators CV1, CV2, CVn, to the inputs b of which are applied the reference voltages RV1, RV2, ... RVn the voltage of which is pre-established when the machine is equipped, in a way known to a person skilled in the art, and which is not deemed to request a detailed description.

When the thresholds established by the reference voltage generators RV1, RV2, ... RVn will be overpassed, there will be corresponding switchings in the comparators CV1, CV2 ... CVn with the presence of a related output signal at the outputs U1, U2 ... Un and in correspondence with the relative break points K1, K2 ... Kn shown on the straight line RV of the chart of FIG. 5a.

The signal coming from the slider C is also carried to a position indicator IP showing at each instant the position of the head 401 in its orbital path.

The signal coming from the slider C is also carried to a derivator with respect to time, which effects the operation dV/dt and drives both a speed indicator IV and the control circuits CM of the speed of rotation of the motor reducer 601. This solution, according to the present invention will be advantageous with respect to the known solutions using a cam operated microswitch or magnetically operated contacts.

In fact the last cited systems cannot supply a continuous signal, displayed instant by instant, of the angular position of the torch. Further, by the arrangement according to the present invention it is possible to dispense with a tachometric generator coupled to the operating motor, in order to control the speed of rotation thereof.

It is to be noted that a solution has been illustrated where a single stroke of the potentiometer "covers" a multiplicity of revolutions of the weld head. The circuitry modifications are obvious, in which the slider of the potentiometer follows a single revolution of the weld head and the operations related to the following pssages will be, each time, switched to a single stroke of the slider.

Having thus described the present invention, what is claimed is:

1. A machine for the automatic butt welding of pipes on tube plates or of abutting pipes of the type having a control unit for programming welding parameters according to cycles suitable to the different welding types and a gun which will be centered on the pipes to be welded, supporting a torch which can effect sequential revolutions, comprising a stationary part and a movable rotatable part with one of said parts being an inner part disposed within the other said part, said other said part forming an outer part, and making surface contact therewith, fluid supply means for supplying cooling and inert gas fluids necessary to the welding operations from the stationary part to the movable part, said fluid supply means comprising a coupling consisting of a first and second plurality of ducts within said parts, a plurality of fluid conveying recesses on the surface of one of said parts communicating said first plurality of ducts with said second plurality of ducts, a plurality of seal elements separating said fluid conveyiing recesses, said fluid conveying recesses providing means for passing the fluids from the ducts of the stationary part to the ducts of the movable part, and a plurality of supplementary recesses alternate to the recesses conveying the fluids, said supplementary recesses having third ducts leading to outside of said outer part so as to drain the fluids possibly escaping from the seal elements and avoiding the mixing of said cooling and inert gas fluids.

2. A machine for the automatic butt weld of pipes as claimed in claim 1, further comprising means for transferring electric power to said torch including an electromechanical joint supporting said torch, an amalgam bath, said joint comprising two rolling races in said amalgam bath and two rolling bodies between said races, the transfer of electric power occurring by the simultaneous presence of said amalgam and said rolling bodies; seal elements located between said two rolling races for containing the amalgam bath; and said two races including a lining of a metal wettable by said amalgam.

3. A machine for the automatic butt weld of pipes, as claimed in claim 2, further comprising means for controllably rotating said torch with respect to the edges of the pipes to be welded, comprising a potentiometer having a slider, a precision voltage source coupled to said potentiometer, mechanical linkage coupled to said torch for imparting rotational movement to said torch, said linkage also being coupled to said slider for providing a prefixed voltage for each angular position of said torch, at the slider of said potentiometer, a multiplicity of pre-adjustable voltage sources corresponding to various pre-established points of the rotational path of the torch, a like multiplicity of voltage comparators connected to said voltage sources, said comparators being arranged for supplying signals in register with the torch passing the pre-established points of rotation established by said pre-adjustable voltage sources, a rotation position indicator connected to said slider for indicating the rotational position of said torch at each instant of rotation, and a deriving circuit also coupled to said slider for supplyiing a voltage signal proportional to the speed of rotation of said torch.

4. A machine for the butt weld of pipes as claimed in claim 1, further comprising a spindle, said spindle including centering elements consisting of balls located on plural planes and angularly displaced inclined surfaces elastically contacting against one another and contacting said balls for pushing said balls outwardly against the inner wall of the pipe to be welded; a floating ring separating each plane of said balls from the contiguous plane, said floating ring being arranged to incline for adapting said spindle to the cross section of the pipe with the balls continuously contacting the wall of the pipe, for maintaining the center of said spindle coincident with the medium axis of the pipe to be welded.

5. A machine for the butt weld of pipes as claimed in claim 1 further having an extension adapted to releaseably receive at one end thereof a torch for butt welds or a torch for butt weld from inside a pipe, bushes for guiding said extension with respect to a pipe, means allowing the supply of the fluids through said extension to preclude errors of position of the torch with respect to the welding plane due to deformations or thermal expansions, said extension consisting of a hollow shaft having helical grooves on the inner surface thereof and a connecting recess at the torch end thereof connecting said grooves, a further bored pipe mounted on said shaft forming therewith ducts for supply and return of the cooling fluid, and forming a central bore by which the inert gas reaches the torch and an insulating element surrounding said extension and shaped so as to avoid dispersions of electric power toward the piece to be welded.

6. A machine as claimed in claim 1 wherein said supplementary recesses comprise first and second supplementary recess pairs, one said pair of recesses being arranged to drain only said cooling fluid and the other said pair of recesses being arranged to drain only said inert gas.

* * * * *